United States Patent
Martin

(10) Patent No.: US 7,024,211 B1
(45) Date of Patent: Apr. 4, 2006

(54) SYSTEM AND METHOD FOR MANAGING TEXT ADVERTISEMENTS TO MOBILE SUBSCRIBERS

(75) Inventor: Dannie E. Martin, Casselberry, FL (US)

(73) Assignee: BellSouth Intellectual Property Corp., Wilmington, DE (US)

(*) Notice: Subject to any disclaimer, the term of this patent is extended or adjusted under 35 U.S.C. 154(b) by 548 days.

(21) Appl. No.: 10/035,090

(22) Filed: Dec. 26, 2001

(51) Int. Cl.
*H04Q 7/20* (2006.01)

(52) U.S. Cl. .................. 455/466; 455/414.2; 455/406; 455/558

(58) Field of Classification Search ............ 455/456.1, 455/456.2, 456.3, 456.4, 456.5, 411, 414.1, 455/414.2

See application file for complete search history.

(56) References Cited

U.S. PATENT DOCUMENTS

| | | | | |
|---|---|---|---|---|
| 5,539,395 | A | * | 7/1996 | Buss et al. .................. 340/7.43 |
| 6,052,591 | A | * | 4/2000 | Bhatia ......................... 455/445 |
| 6,415,291 | B1 | * | 7/2002 | Bouve et al. .................. 707/10 |
| 6,452,498 | B1 | * | 9/2002 | Stewart .................... 340/573.1 |
| 6,647,269 | B1 | * | 11/2003 | Hendrey et al. ........... 455/3.03 |
| 2002/0032035 | A1 | * | 3/2002 | Teshima ..................... 455/456 |
| 2002/0077118 | A1 | * | 6/2002 | Zellner et al. .............. 455/456 |
| 2002/0151313 | A1 | * | 10/2002 | Stead ......................... 455/456 |
| 2004/0145459 | A1 | * | 7/2004 | Himmelstein .......... 340/426.19 |
| 2005/0043060 | A1 | * | 2/2005 | Brandenberg et al. ...... 455/558 |

* cited by examiner

Primary Examiner—Temica Beamer
(74) Attorney, Agent, or Firm—Withers & Keys, LLC

(57) ABSTRACT

A device for managing text messages sent by an advertiser to mobile subscribers. According to one embodiment, the device may include an advertiser interface module for receiving from the advertiser content of a text message and at least one criterion. In addition, the device may include a database management module in communication with the advertiser interface module for interrogating a database to determine the mobile subscribers that satisfy the criterion.

18 Claims, 5 Drawing Sheets

SYSTEM AND METHOD FOR MANAGING TEXT ADVERTISEMENTS TO MOBILE SUBSCRIBERS

BACKGROUND OF INVENTION

The Wireless Application Protocol (WAP) is designed to work on any existing wireless service, using such standards as SMS. SMS, or Short Message Service, is a text message service that enables short messages, usually no more than a few hundred characters in length, to be sent to and transmitted from a wireless telephone or other wireless devices. SMS appeared on the wireless scene in 1991 in Europe. The European standard for digital wireless, now known as the Global System for Mobile Communications (GSM), included short messaging services from the outset. In North America, SMS is provided on digital wireless networks based on GSM, code division multiple access (CDMA), or time division multiple access (TDMA) standards.

Unlike paging, short messages are stored and forwarded in SMS centers and the messages travel over the system's control channel, which is separate and apart from the voice channel.

BRIEF SUMMARY OF THE INVENTION

According to one embodiment, the present invention is directed to a device for managing text messages sent by an advertiser to mobile subscriber. The device may include an advertiser interface module for receiving from the advertiser content of a text message and at least one criterion. In addition, the device may include a database management module in communication with the advertiser interface module for interrogating a database to determine the mobile subscribers that satisfy the criterion.

BRIEF DESCRIPTION OF THE FIGURES

Embodiments of the present invention are described in conjunction with the following figures, wherein.

DETAILED DESCRIPTION OF THE INVENTION

Figure 1:
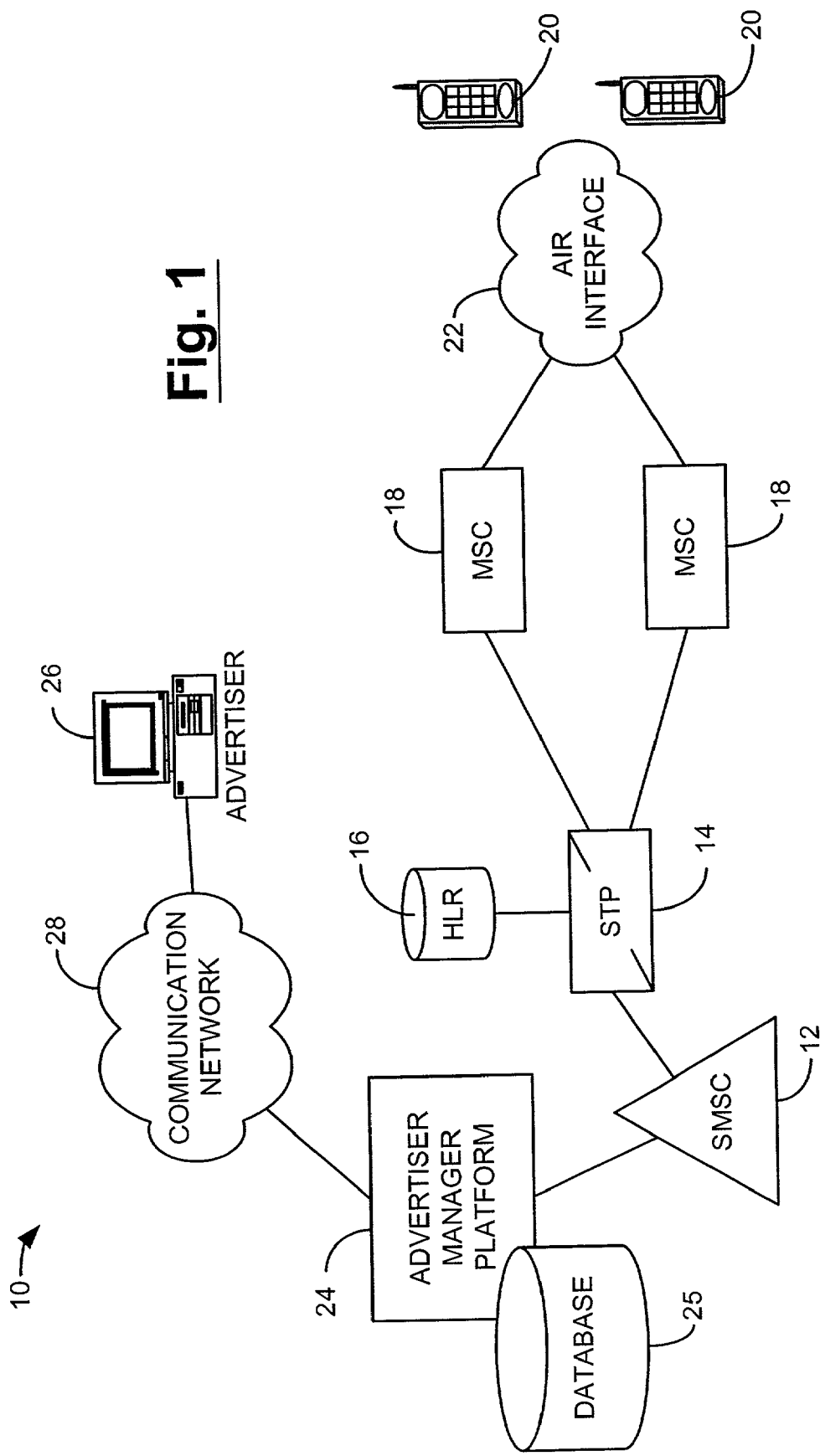
FIG. 1 is a diagram of a system according to one embodiment of the present invention.

FIG. 1 is a diagram of a system 10 for managing advertisements to mobile subscribers according to one embodiment of the present invention. According to one embodiment, as illustrated in FIG. 1, the system 10 may be based on an intelligent network (IN) IS-41 short message service (SMS) architecture. SMS is typically characterized by out-of-band packet delivery and low-bandwidth message transfer, which results in a highly efficient means for transmitting short bursts of data. Generally, SMS text messages are no more than a few hundred characters in length.

As illustrated in FIG. 1, the system 10 may include a short message service center (SMSC) 12, a signal transfer point (STP) 14, a home location register (HLR) 16, and a mobile switching center (MSC) 18. In FIG. 1, two MSCs 18 are illustrated. The MSCs 18 may be in communication with wireless devices 20 via an air interface 22. The air interface 22 may support digital wireless communications such as, for example, GSM, CDMA or TDMA standards. The wireless devices 20 may be any type of wireless device capable of receiving text messages such as, for example, a wireless telephone, such as a WAP (Wireless Application Protocol) phone. Additionally, the wireless devices 20 may be, for example, pagers, handheld computers or personal digital assistants (PDAs). As used herein, a "mobile subscriber" means a user of one of the wireless devices 20.

The SMSC 12 may be a combination of hardware and software responsible for relaying and storing/forwarding a short message between a short message entity and one of the mobile devices 20. The STP 14 may be a multi-port high-speed packet switch that is programmed to respond to the routing information in the appropriate layer of the switching protocol, such as the signaling system 7 (SS7) protocol, and route the data packets to their intended destination. The HLR 16 may be a database used for permanent storage and management of subscriptions and service profiles for mobile subscribers. Upon interrogation by the SMSC 12, via the STP 14, the HLR 16 may provide the routing information for the indicated mobile subscriber.

The MSCs 18 may be automatic switching systems in a wireless telecommunications network that acts as the interface for subscriber traffic between the wireless network and the landline network or other MSCs in the same or other wireless networks. The MSCs 18 may perform the same general function as a central office switch in a landline based system. In addition, the MSCs 18 may support incoming calls through a radio telecommunications front-end (the air interface 22), as well as handoff and roaming functions. Accordingly, the MSCs 18 may include wireless IN functionality for detecting originating and terminating triggers. Other elements of a wireless IN are not illustrated in FIG. 1 for purposes of clarity, such as SS7 network element including service control points (SCPs) and service nodes, as well as wireless network elements such as a visitor location register (VLR) and base station (BS).

Also illustrated in FIG. 1 as part of the system 10 is an advertiser manager platform 24. The advertiser manager platform 24 may be implemented as an intelligent platform such as, for example, a computer, such as a workstation or a personal computer, or a network server. According to another embodiment, the advertiser manager platform 24 may be implemented on an intelligent peripheral (IP) device of an intelligent telecommunications network, such as a service node of an Advanced Intelligent Network (AIN).

The advertiser manager platform 24 may be in communication with the SMSC 12 and a database 25, and provide functionality for advertisers to tailor text messages sent to mobile subscribers via the SMSC 12. Accordingly, the advertiser manager platform 24 may be in communication with an advertiser 26 via a communication network 28. The communications network 28 may be any network capable of allowing the advertiser 26 to interface with the advertiser manager platform 24 such as, for example, the Internet, an intranet, a LAN, a WAN or a MAN, using, for example, a packet-switching transmission mode. The database 25 may store demographic data regarding the mobile subscribers such as, for example, age, marital status, address, number and age of any children, annual income, etc.

Figure 2:
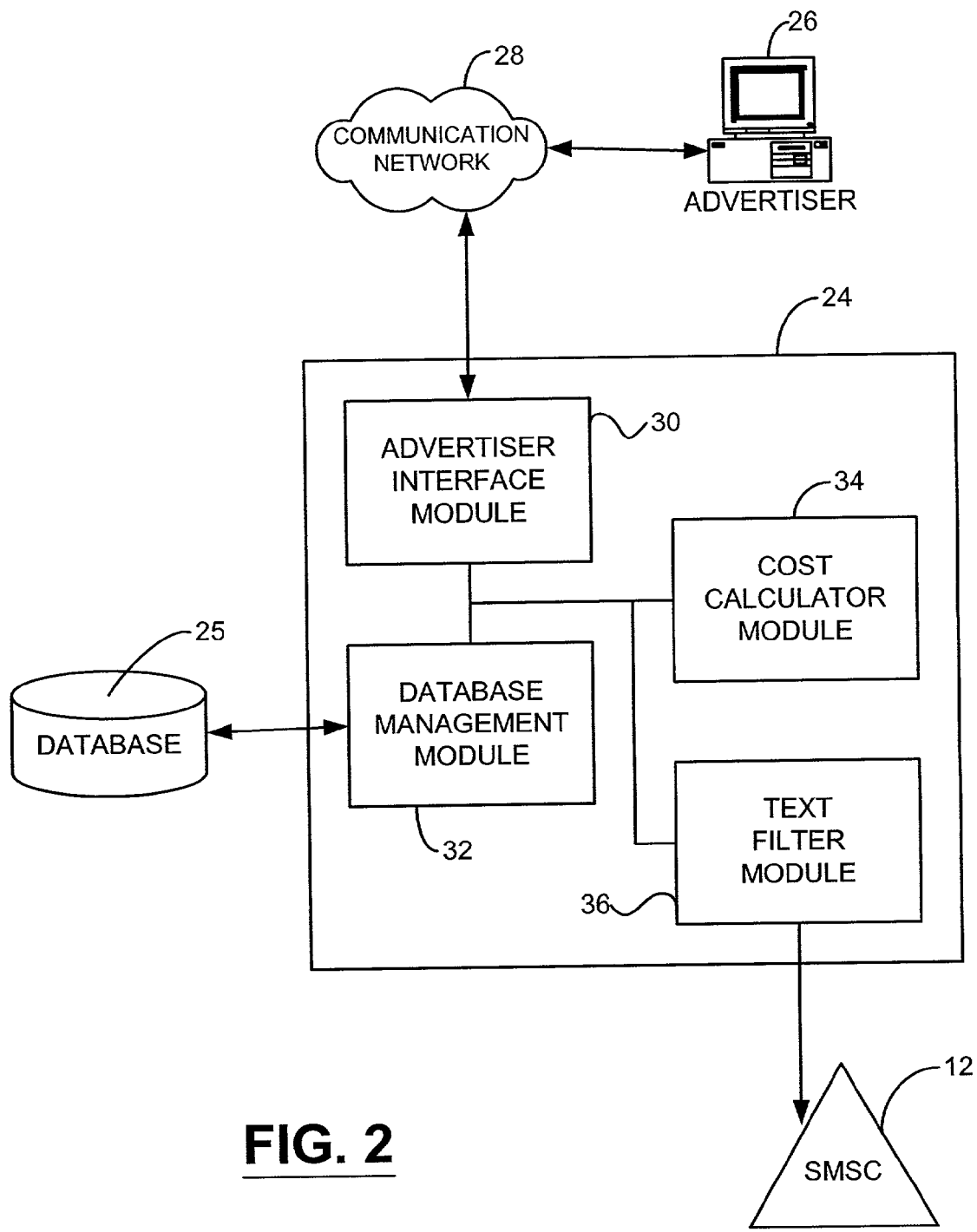
FIG. 2 is a diagram of the advertiser manager platform of the system of FIG. 1 according to one embodiment of the present invention.

FIG. 2 is a diagram of the advertiser manager platform 24 according to one embodiment of the present invention. As illustrated in FIG. 2, the advertiser manager platform 24 includes an advertiser interface module 30, a database manager module 32, a cost calculator module 34 and a text filter module 36, each in communication with one another. The modules 30, 32, 34, 36 may be implemented as software code to be executed by a processor (not shown) of the advertiser manager platform 24 using any suitable computer language such as, for example, Visual Basic, Java, C++ or Perl using, for example, conventional or object-oriented techniques. The software code may be stored as a series of instructions or commands on a computer readable medium, such as a random access memory (RAM), a read only memory (ROM), a magnetic medium such as a hard-drive or a floppy disk, or an optical medium such as a CD-ROM.

The advertiser interface module 30 may provide an interface by which an advertiser 26, in communication with the advertiser manager platform 24 via the communication network 28, may specify the content of text messages to be sent to mobile subscribers. Furthermore, the advertiser interface module 30 may allow the advertiser 26 to designate certain demographic groups of mobile subscribers to which the message is to be sent. In addition, the advertiser interface module 30 may allow the advertiser 26 to specify other parameters relevant to the message such as, for example, the time it is to be sent.

According to one embodiment, the advertiser interface module 30 may provide this functionality through a web-based interface. For example, the advertiser interface module 30 may provide an interactive web page allowing the advertiser 26 to specify, for example, the content of the message, demographic criteria, time of delivery, etc., in a format suitable for the browsing software of the advertiser terminal 26, such as according to HTML or XML formats. As an example, the advertiser interface module 30 may allow an advertiser to generate a message concerning local movie times to be sent to all male mobile subscribers between 18 and 34 years of age at 5 pm Friday.

The database management module 32 may interrogate the database 25, which contains the mobile subscriber information, to determine which mobile subscribers satisfy the demographic criteria specified by the advertiser. The cost calculator module 34 may determine the cost of transmitting the message to each of the eligible mobile subscribers. The cost may be based on the cost of transmitting each message (which may be time-of-day dependent, for example) and the number of messages to be transmitted. According to one embodiment, the cost of the message transmittal may be communicated to the advertiser via the advertiser interface module 30 before the advertiser authorizes the message prior to transmittal. In this way, the potential for discrepancies between the advertiser's perceived cost and the actual cost may be minimized prior to actual transmission of the messages to the mobile subscribers. In addition, it may allow the advertiser to narrow or expand the demographic criteria based on the calculated cost.

The text filter module 36 may filter the text message for inappropriate words prior to transmission by the SMSC 12. According to one embodiment, the text filter module 36 may filter the text message by comparing character strings of the message with character strings stored in a database (not shown) storing predetermined inappropriate character strings. According to one embodiment, the text filter module 36 may replace an inappropriate character string with an appropriate one. According to another embodiment, when the text filter module 36 detects an inappropriate character string, the advertiser interface module 30 may require the advertiser to modify the offending character string prior to transmission of the message.

According to one embodiment, the advertiser manager platform 24 may be in communication with a human interface to resolve certain problems detected by the advertiser manager platform and to provide the advertiser with technical support for the system.

Access to the advertiser interface module 30 may be based on an authentication process for security purposes so that unauthorized users may access the platform 24. In addition, advertisers may be charged a subscription fee for access to the system in addition to the costs of transmitting each message. Further, to entice mobile subscribers to avail themselves to such advertising, their wireless service provider may offer the mobile subscribers a reduced rate for their wireless service.

Figure 3:
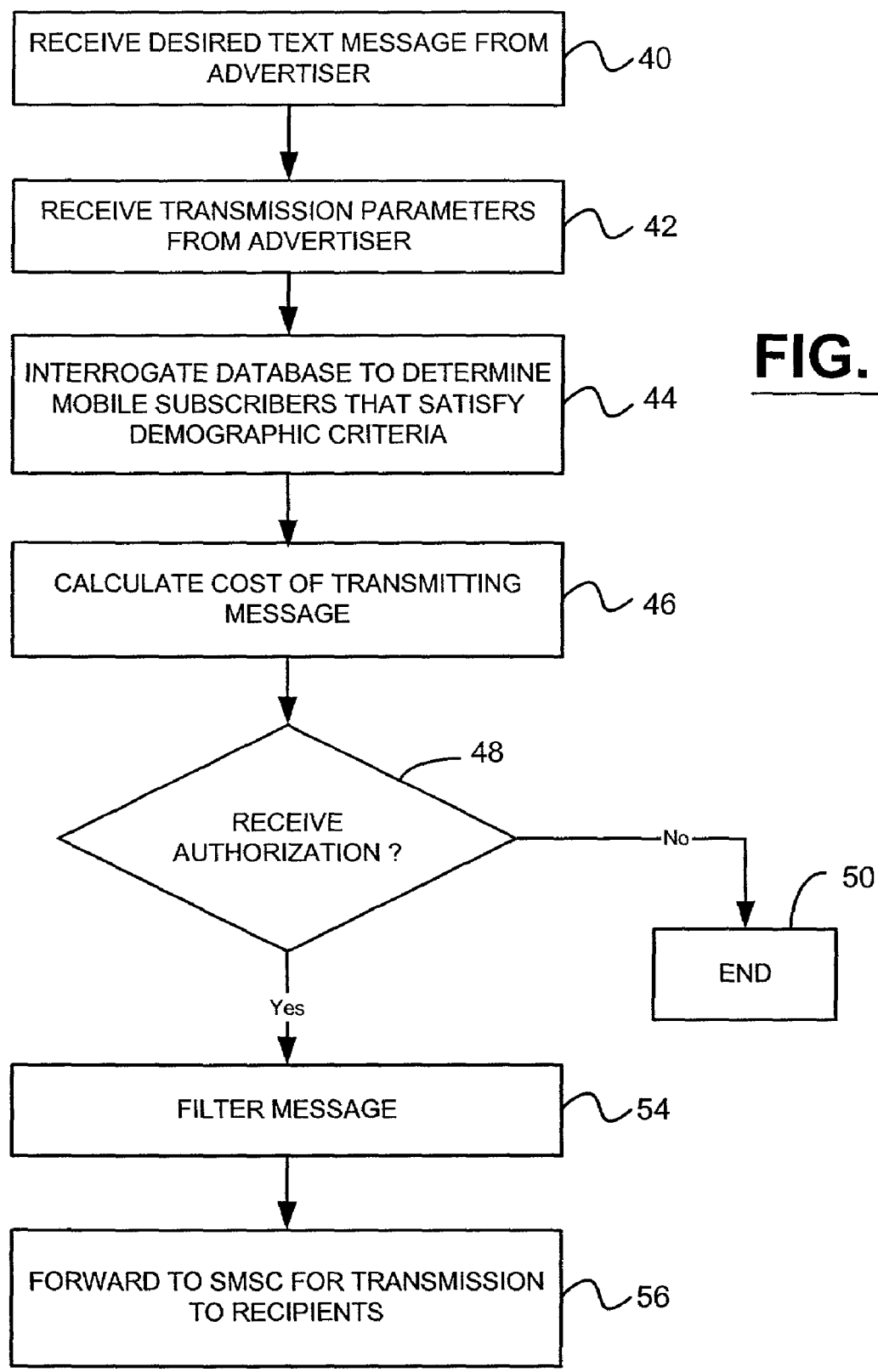
FIG. 3 is a diagram of a process flow through the advertiser manager platform of FIG. 2 according to one embodiment of the present invention.

FIG. 3 is a diagram of the process flow through the advertiser manager platform 24 according to one embodiment. The process initiates at block 40 with the advertiser interface module 30 receiving the specified text message from the advertiser. At block 42 the advertiser interface module 42 may receive from the advertiser parameters for the message such as, for example, the demographic criteria and the time the message is to be sent.

At block 44 the database management module 32 may interrogate the database 25 as described previously. At block 46, the cost calculator module 34 may calculate the cost of transmitting the message to each of the mobile subscribers that satisfy the demographic criteria (hereinafter the "recipients"). At block 48, the advertiser interface module 30 may request that the advertiser authorize transmission of the messages to the recipients after viewing, for example, the cost information.

If the advertiser does not provide authorization, the process ends at block 50. Conversely, if at block 48 the advertiser provides authorization, the process advances to block 54 where the text filter module 36 may filter the text message as described previously. From block 54 the process advances to block 56 where the advertiser manager platform 24 may send the message to the SMSC 12 for transmission to the recipients.

Figure 4:
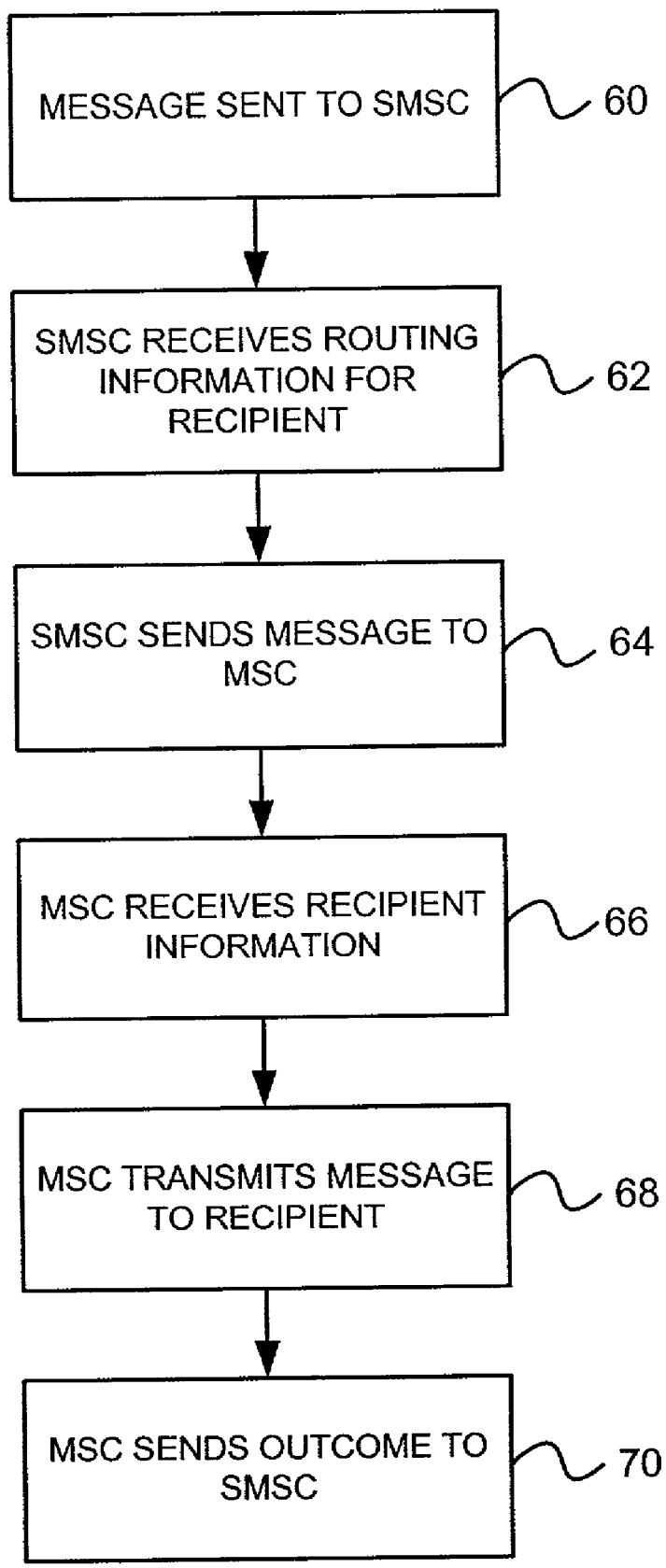
FIG. 4 is a diagram illustrating a process of sending a text message to a recipient using the system of FIG. 1 according to one embodiment of the present invention.

FIG. 4 is a diagram of the process by which the system 10 may transmit the text message to the intended mobile subscribers according to one embodiment of the present invention. The process of FIG. 4 is described in connection with sending a message to one mobile subscriber (i.e., the recipient). By a similar process, the message may be sent to each of the recipients.

The process initiates at block 60 where the advertiser manager platform 24 sends the text message specified by the advertiser to the SMSC 12. At block 62, after completing its internal processing, the SMSC 12 interrogates the HLR 16 to obtain the routing information for the recipient. According to one embodiment, this may be accomplished via the use of the SMSrequest and SendRoutingInfoForShrtMsg mechanisms in, for example, IS-41 or GSM.

Next, at block 64, the SMSC 12 sends the message to the appropriate MSC 18 using, for example, the forward short message operation. The appropriate MSC 18 is the MSC serving the wireless device 20 of the recipient. This operation may be may be accomplished via the use of the short message delivery-point-to-point (SMD-PP) and forward-ShortMessage mechanisms in IS-41 or GSM.

At block 66, the MSC 18 retrieves information regarding the recipient from a network database. The network database may be the HLR 16 or a VLR (not shown), depending on the physical location of the recipient. This operation may include an authentication procedure. At block 68, the MSC 18 transfers the message to the wireless device 20 of the recipient using, for example, the forward short message operation. At block 70, the MSC 18 may return to the SMSC 12 a delivery report detailing the outcome of the forward short message operation. The SMSC 12 may use the report to generate a billing record to facilitate processing of the bill for the advertiser for use of the service. As such, the billing record may be used to charge the advertiser for sending the text message to the recipients. In addition, the SMSC 12 may forward a delivery receipt to the advertiser manager platform 24 to be displayed for the advertiser.

Figure 5:
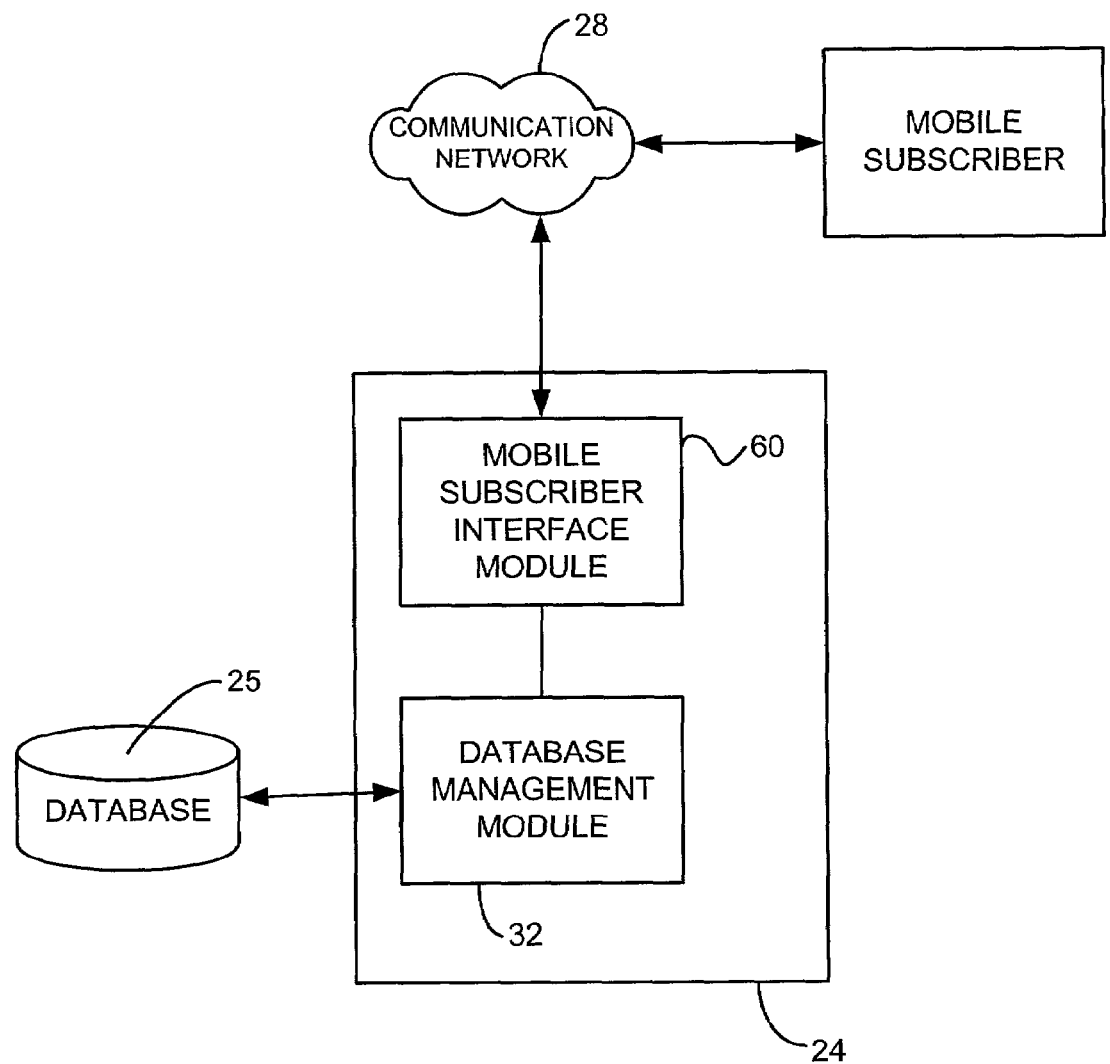
FIG. 5 is a diagram of the advertiser manager platform according to another embodiment of the present invention.

According to one embodiment, the system 10 may additionally provide the mobile subscribers with the ability to manage their database. FIG. 5 is a diagram of the advertiser manager platform 24 according to one such embodiment. As illustrated in FIG. 5, the advertiser manager platform 24 may include a mobile subscriber interface module 60. Other modules of the advertiser manager platform 24, such as the cost calculator module 34 and the text filter module 36, are not shown in FIG. 5 for purposes of clarity. The module 60 may be implemented as software code to be executed by a processor (not shown) of the advertiser manager platform 24 using any suitable computer language such as, for example, Visual Basic, Java, C++ or Perl using, for example, conventional or object-oriented techniques. The software code may be stored as a series of instructions or commands on a computer readable medium, such as a random access memory (RAM), a read only memory (ROM), a magnetic medium such as a hard-drive or a floppy disk, or an optical medium such as a CD-ROM.

The mobile subscriber interface module 60 may be in communication with the mobile subscriber via the communications network 28 and allow the mobile subscriber to add, delete or otherwise modify criteria that the advertiser may specify when designating the desired recipients. According to one embodiment, the mobile subscriber interface module 60 may provide this functionality through a web-based interface, much like the advertise interface module 30. For example, the mobile subscriber interface module 60 may provide a web page questionnaire for the mobile subscriber to enter, for example, his interests or other information relative to advertisers. The mobile subscriber may access the web page from his wireless device 20 or any other device capable of communication with via the communications network 28 with the advertiser manager platform 24, such as the mobile subscriber's home PC. According to one embodiment, the URL for the web page may be provided on the mobile subscriber's periodic billing statement or available through various Internet search engines.

As used herein, the term "advertiser" refers to any person, organization or entity desiring to send a message to a mobile subscriber.

It is to be understood that the present description illustrates those aspects of the invention relevant to a clear understanding of the invention. Certain aspects of the invention that would be apparent to those of ordinary skill in the art and that, therefore, would not facilitate a better understanding of the invention, have not been presented in order to simplify the present description. Although the present invention has been described in connection with certain embodiments, those of ordinary skill in the art will, upon considering the foregoing description, recognize that many modifications and variations of the invention may be employed. For example, steps of the process illustrated in FIG. 3 may be performed in varying orders. It is intended that all such variations and modifications of the inventions be covered by the foregoing description and following claims.

What is claimed is:

1. A device for managing text messages sent by an advertiser to mobile subscribers, comprising:
   an advertiser interface module for receiving from the advertiser content of a text message and at least one criterion;
   a database management module in communication with the advertiser interface module for interrogating a database to determine the mobile subscribers that satisfy the criterion; and
   a cost calculator module in communication with the advertiser module for automatically calculating a cost of transmitting the text message to each of the mobile subscribers that satisfy the criterion in response to receiving the content and prior to the text message being sent.

2. The device of claim 1, further comprising a text filter module in communication with the advertiser interface module for filtering the content of the text message for predetermined character strings.

3. The device of claim 1, further comprising a mobile subscriber interface module in communication with the database management module.

4. The device of claim 1, wherein the advertiser interface module is further for receiving from the advertiser a time at which the text message is to be transmitted to the mobile subscribers that satisfy the criterion.

5. The device of claim 1, wherein the text message is short message system message.

6. A method for managing text messages to be sent from an advertiser to mobile subscribers, comprising:
   receiving content of a text message from the advertiser;
   receiving from the advertiser at least one criterion for the mobile subscribers;
   determining the mobile subscribers that satisfy the criterion;
   in response to receiving the content of the text message, automatically calculating a cost of sending the text message to each of the mobile subscribers that satisfy the criterion;
   providing the calculated cost to the advertiser; and
   sending the text message to each of the mobile subscribers that satisfy the criterion upon receiving authorization to send the message from the advertiser where the authorization is based at least on the calculated cost.

7. The method of claim 6, further comprising:
   receiving from the advertiser a time at which the text message is to sent, and wherein sending the text message includes sending the text message at the time specified by the advertiser;
   filtering the text message for predetermined character strings prior to sending the text message; and
   charging the advertiser for sending the text message to each of the mobile subscribers that satisfy the criterion.

8. The method of claim 6, further comprising charging the mobile subscribers a reduced wireless service subscription rate for permission to send text messages from the advertiser to the mobile subscribers.

9. The method of claim 6, further comprising receiving an input from at least one mobile subscriber relative to the criterion.

10. A computer readable medium containing instructions thereon that, when executed by a computer, implement an advertiser manager platform comprising:

an advertiser interface module that provides an interface for receiving advertisement messages and at least one criterion from an advertiser; and a database management module that interrogates a database storing subscriber information to compare the subscriber information to the at least one criterion to determine which subscribers should be sent the messages from the advertiser; and a cost calculation module that automatically determines a cost of sending each message to the number of subscribers determined by the database management module prior to the message being sent.

11. The computer readable medium of claim 10, wherein the advertiser manager platform is implemented within an AIN.

12. The computer readable medium of claim 10, wherein the advertiser manager platform is implemented within an IP network.

13. The computer readable medium of claim 10, wherein the advertiser manager platform is implemented upon a network server.

14. The computer readable medium of claim 10, wherein the at least one criterion is a demographic of subscribers and wherein the database management module interrogates the database storing subscriber demographic information to compare the demographic from the advertiser to the demographic information of the subscribers.

15. The computer readable medium of claim 10, wherein the advertiser interface module provides a web based interface for interaction with advertisers to receive the messages and the at least one criterion.

16. The computer readable medium of claim 14, wherein the advertiser is charged a subscription fee for access to the web based interface.

17. The computer readable medium of claim 10, wherein the advertiser manager platform further comprises a text filter module that filters the text of the messages.

18. The computer readable medium of claim 10, wherein the advertiser manager platform communicates with a short message service center to provide for delivery of the message to subscribers and to verify that delivery has occurred, and wherein the advertiser manager platform bills the advertiser for delivery of a message to a subscriber upon verification of delivery.

* * * * *